(12) United States Patent
McMillan et al.

(10) Patent No.: US 7,028,019 B2
(45) Date of Patent: Apr. 11, 2006

(54) METHOD AND SYSTEM OF MANAGING SOFTWARE CONFLICTS IN COMPUTER SYSTEM THAT RECEIVE, PROCESSING CHANGE INFORMATION TO DETERMINE WHICH FILES AND SHARED RESOURCES CONFLICT WITH ONE ANOTHER

(75) Inventors: John J. McMillan, Milford, MI (US); Gary D. Chirhart, Rochester Hills, MI (US)

(73) Assignee: Wise Solutions, Inc., Canton, MI (US)

( * ) Notice: Subject to any disclaimer, the term of this patent is extended or adjusted under 35 U.S.C. 154(b) by 683 days.

(21) Appl. No.: 09/189,559

(22) Filed: Nov. 11, 1998

(65) Prior Publication Data

US 2003/0014381 A1    Jan. 16, 2003

(51) Int. Cl.
G06F 17/30    (2006.01)

(52) U.S. Cl. .......................... 707/1; 707/100; 707/200; 713/1; 713/100; 710/104; 717/121; 717/174

(58) Field of Classification Search ................ 707/1–3, 707/10, 202–205, 100–104, 511, 200; 717/1–11, 717/175–176, 121, 174; 713/1, 100; 714/25–27, 714/37–38, 46–52, 7; 709/217, 221; 710/104
See application file for complete search history.

(56) References Cited

U.S. PATENT DOCUMENTS

| 4,558,413 | A | 12/1985 | Schmidt et al. | 707/203 |
| 4,809,170 | A | 2/1989 | Leblang et al. | 717/3 |
| 5,019,963 | A | 5/1991 | Alderson et al. | 707/201 |
| 5,155,847 | A | 10/1992 | Kirouac et al. | 709/221 |
| 5,247,683 | A | 9/1993 | Holmes et al. | 709/221 |

(Continued)

FOREIGN PATENT DOCUMENTS

EP    1148417 A2 * 10/2001

(Continued)

OTHER PUBLICATIONS

Dick Bowman, "F2 for windows", Sep. 1995, vol. 26, No. 1, pp. 49-54.*

(Continued)

*Primary Examiner*—Srirama Channavajjala
(74) *Attorney, Agent, or Firm*—Gifford, Krass, Groh, Sprinkle, Anderson & Citkowski, PC

(57) ABSTRACT

Method and system for managing software conflicts and a computer-readable storage medium having a program for executing the method is provided wherein a database of interrelated tables is utilized. The invention may be used to manage file and registry conflicts on Windows desk tops. The invention determines information about changes made by applications during their installation into a computer system, one application at a time. Those changes are then compared to determine which files and other shared resources conflict with one another. This conflict information is then used to attempt to resolve software conflicts. Conflicts can be identified at many different levels: files, registries, shortcuts, ODBC drivers, ODBC data sources, service, device, components, autoexec.bat, config.sys, INI changes, and paths. This invention stores all information needed to recreate the installation in the database itself. Thus, when changes (i.e. when conflicts between multiple applications are being resolved) are made to the database, a needed installer for that application can be generated. The database categorizes all file types and breaks the information down into manageable tables of information. These tables relate to each other in an intricate web that allows a thorough illustration of files.

65 Claims, 5 Drawing Sheets

U.S. PATENT DOCUMENTS

| | | | |
|---|---|---|---|
| 5,564,051 A | 10/1996 | Halliwell et al. | 707/200 |
| 5,574,898 A | 11/1996 | Leblang et al. | 707/1 |
| 5,581,764 A | 12/1996 | Fitzgerald et al. | 707/3 |
| 5,603,027 A | 2/1997 | Ohkami | 707/200 |
| 5,748,980 A * | 5/1998 | Lipe et al. | 710/8 |
| 5,764,992 A | 6/1998 | Kullick et al. | 717/11 |
| 5,787,444 A | 7/1998 | Gerken et al. | 707/203 |
| 6,018,747 A * | 1/2000 | Burns et al. | 707/203 |
| 6,128,730 A * | 10/2000 | Levine | 713/1 |
| 6,192,375 B1 * | 2/2001 | Gross | 707/1 |
| 6,301,710 B1 * | 10/2001 | Fujiwara | 717/175 |
| 6,408,434 B1 * | 6/2002 | Fujiwara | 717/170 |
| 6,493,871 B1 * | 12/2002 | McGuire et al. | 717/173 |
| 6,549,978 B1 * | 4/2003 | Mansur et al. | 711/114 |
| 6,564,369 B1 * | 5/2003 | Hove et al. | 717/121 |
| 6,832,371 B1 * | 12/2004 | Hussey | 717/165 |
| 2003/0014381 A1 * | 1/2003 | McMillan et al. | 707/1 |

FOREIGN PATENT DOCUMENTS

| | | | |
|---|---|---|---|
| WO | WO 98/47057 | * | 10/1998 |

OTHER PUBLICATIONS

Cynthia F. Cohen et al. "managing conflict in software testing", commjunications of the ACM, Jan. 2004, vol. 47, No. 1 pp 76-81.*

Brian K Lewis, "Software conflicts", Tech Talk (Jun. 1997), Sarasota PC Monitor, copyright 1997, 3 pages.*

* cited by examiner

METHOD AND SYSTEM OF MANAGING SOFTWARE CONFLICTS IN COMPUTER SYSTEM THAT RECEIVE, PROCESSING CHANGE INFORMATION TO DETERMINE WHICH FILES AND SHARED RESOURCES CONFLICT WITH ONE ANOTHER

TECHNICAL FIELD

This invention relates to methods and systems for managing software conflicts and computer-readable storage medium having a program for executing the method and, in particular, to methods and systems for managing software conflicts and computer-readable storage medium having a program for executing the method utilizing a database of interrelated tables.

BACKGROUND ART

With the power of today's application development tools, a developer can create a custom application more quickly than ever. However, there is a significant hurdle getting those applications to the desktop due to file and other shared resource conflicts.

Software conflicts oftentimes arise when multiple software applications modify a shared resource such as a file, registry key, or icon that is being used by another application that is installed on the same computer.

Anyone managing the distribution of applications to users has very likely experienced what is commonly referred to as "DLL Hell." Simply put, DLL hell occurs when one program disables others by installing an incompatible dynamic link library, or DLL, file. This corrupts one's system in one of two ways. In the first instance, an application installs an older DLL over a newer one. The second instance occurs when a newer DLL is properly installed but an application won't work with the new version. In addition, other non-file system resources such as the registry, icons, or system services may be replaced with incompatible versions.

Independent software vendors distribute the DLLs and other support files they've tested during development. However, newer support files that already exist on the destination computer may already have superseded these by the time users load them.

In theory, a vendor's installation routine should double-check to see if a newer version of a shared DLL is already on the target system. Yet vendors have been sloppy or overly cautious about this. On the sloppy side of the equation, some installation routines simply don't check for existing DLLs. In the interest of caution, though, some vendors intend to copy the specific DLL that they've tested, which gives them some cause for confidence. Copying older DLL versions means the newly installed application will work, but applications that rely on later versions of the DLL are now more likely to encounter problems.

Even if the newer version of the shared component copies over older versions there can be problems. It is not always the case that an updated version of a shared component will be completely backward compatible.

In addition, the version information associated with shared files is not always accurate. In many cases, there are multiple indications of the version of a file. The last date/time the file was modified can be used to indicate the version of the file. In addition, many files include one or more internal version numbers. Problems occur when the different version numbers for a file are in error or disagree with each other.

The file system namespace readily allows collisions. Vendors currently tend to throw many of their support files into a common directory such as the System directory. Further, even though Microsoft's 32-bit OSes allow long filenames, most vendors stick to the 8.3 convention; they must if their DLLs are also for 16-bit environments. Plus, their files may someday reside on a shared network drive that supports only short names.

There are only so many eight-character names—fewer when you use meaningful abbreviations and short words. When two developers use a name like DISPLAY.DLL, conflicts occur.

End users are often unaware that underlying system-level components have changed. Loading something like an Internet Explorer browser update can update low-level OS components—the lowest-level TCP/IP protocol stack DLLs, for example. There may be no direct relation; Microsoft may have used the update to slipstream a number of OS patches.

The result is that it becomes harder for vendors to support their products because it is difficult to tell exactly what set of system DLLs any given user has. Developers dislike working in the Microsoft environment right now describing it as a "snake pit" from a support standpoint because they don't know what their customers have.

This problem has been very difficult to prevent and identify until it is too late, resulting in system failures and significant user downtime. DLLs represent only one of several file conflicts that may occur. Conflicts can also occur at different levels in registry keys, components, paths, and drivers making the problem all the more complex.

Accordingly, there is a need for an improved method of identifying and resolving file, registry and other shared component conflicts between multiple applications.

The Kullick et al. U.S. Pat. No. 5,764,992 provides for a method and apparatus for automatic software replacement. An automated software upgrade method is described which allows a software program to determine if it and its associated programs are the newest versions and to replace themselves if necessary.

The Gerken et al. U.S. Pat. No. 5,787,444 provides for a method and apparatus for maintaining revision control of a set of objects within a data processing system. In the context of software revision control, an object oriented method of maintaining control of hierarchically linked data is described.

The Alderson et al. U.S. Pat. No. 5,019,963 provides for a data processing network with upgrading of files. A central host is described which maintains a list of files accessible by a remote client and provides the most current version when a client so requests.

The Holmes et al. U.S. Pat. No. 5,247,683 provides for a system and method for installing software and updating configuration files. A method of maintaining a system's configuration file is described which automatically determines how to update an existing configuration file to accommodate a new application.

The Halliwell et al. U.S. Pat. No. 5,564,051 provides for an automatic update of static and dynamic files at a remote network node in response to calls issued by or for application programs. An application management system is described which identifies and replaces out-of-date files and augments or creates files which are needed.

The Fitzgerald et al. U.S. Pat. No. 5,581,764 discloses a distributed computer network including hierarchical resource information structure and a related method of distributing resources.

The following patens are also relevant: U.S. Pat. No. 4,558,413 to Schmidt et al.; U.S. Pat. No. 4,809,170 to Leblang et al.; U.S. Pat. No. 5,155,847 to Kirouac et al.; U.S. Pat. No. 5,574,898 to Leblang et al.; and U.S. Pat. No. 5,603,027 to Ohkami.

DISCLOSURE OF INVENTION

An object of the present invention is to provide a method and system for managing software conflicts and computer-readable storage medium having a program for executing the method wherein a database of interrelated tables is utilized.

Another object of the present invention is to provide a method and system for managing software conflicts and computer-readable storage medium having a program for executing the method wherein conflicts are identified before software applications are introduced to a computer system, thus improving user productivity by eliminating system outages and downtime.

In carrying out the above objects and other objects of the present invention, a method is provided for managing software conflicts. The method includes the step of determining changes made to a computer system's files and other shared resources during installation of at least one application into the computer system to obtain change information. The method includes the step of processing the change information to determine which files and shared resources conflict with one another to obtain conflict information. The method also includes the steps of storing the conflict information in a database of interrelated tables and resolving the software conflicts based on the stored conflict information.

Further in carrying out the above objects and other objects of the present invention, a computer-readable storage medium having stored therein a program is provided. The program executes the above-noted method steps.

Yet still further in carrying out the above objects and other objects of the present invention, a system is provided for managing software conflicts in accordance with the above-noted method steps.

The software conflicts may include file conflicts, registry conflicts, shortcut conflicts, ODBC driver conflicts, ODBC data source conflicts, service conflicts, device conflicts, component conflicts, autoexec.bat conflicts, config.sys conflicts, INI changes conflicts, and path conflicts.

The benefits accruing to the use of the present invention are numerous. For example, the customer benefits because conflicts are identified before the applications are rolled out onto their desk tops. This saves an organization valuable support staff time. It avoids user downtime, and reduces regression testing to those applications that have identified conflicts.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
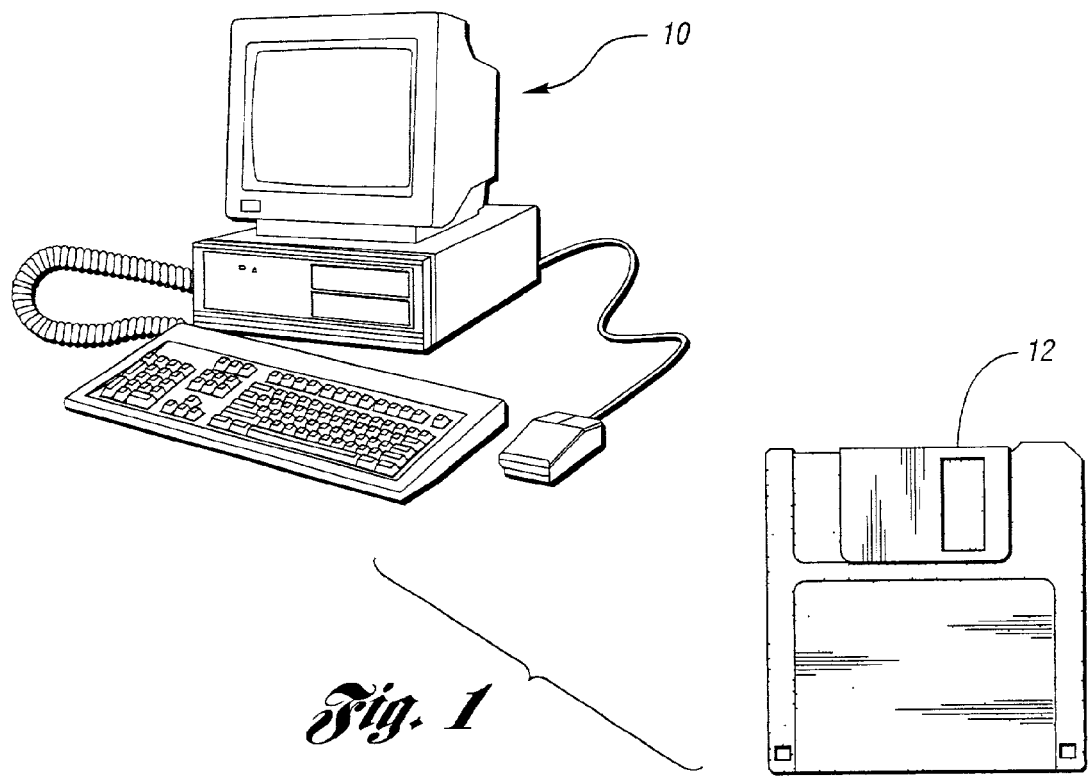
FIG. 1 is a schematic view of a computer system including a computer-readable storage medium configured with data which the computer system operates on to carry out the method of the present invention.

Referring now to FIG. 1, there is illustrated a computer system, generally indicated at 10, which, when appropriately programmed with computer-readable data encoded in a computer-readable storage medium such as a floppy disk 12, is capable of carrying out the method of the present invention. In general, the present invention is used to import, export, and analyze the changes made by an application to a computer system during its installation. In addition, it is used to compare software applications and determine which files and shared resources conflict with one another. This conflict information is fed into a database that is then used to attempt to resolve software conflicts. The database categorizes all system changes and breaks the information down into manageable tables of information. These tables relate to each other in an intricate web that allows a thorough illustration of all the changes.

Figure 3:
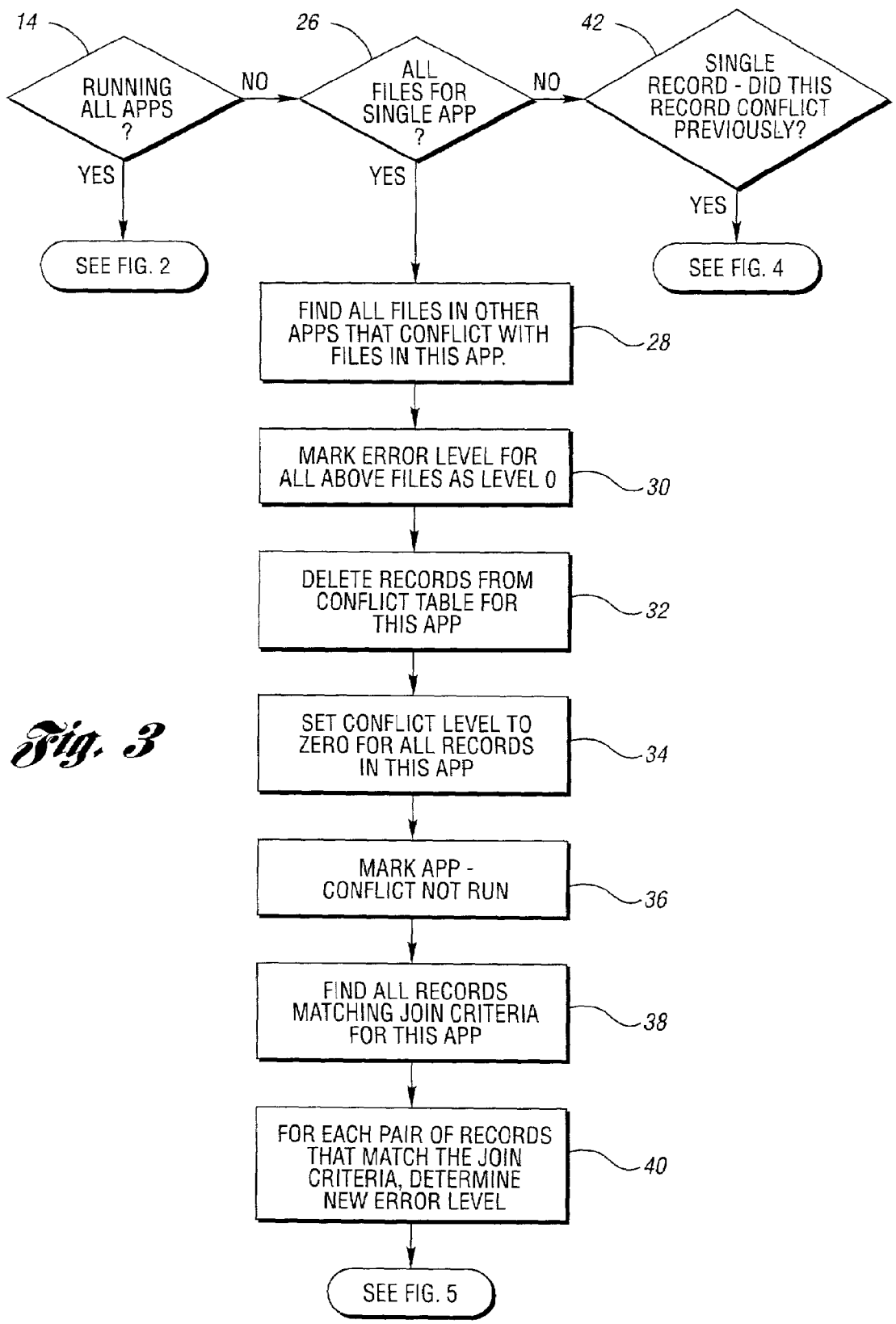
FIG. 3 is a block diagram flow chart which illustrates an algorithm for determining conflicts on files for a single application.
Figure 4:
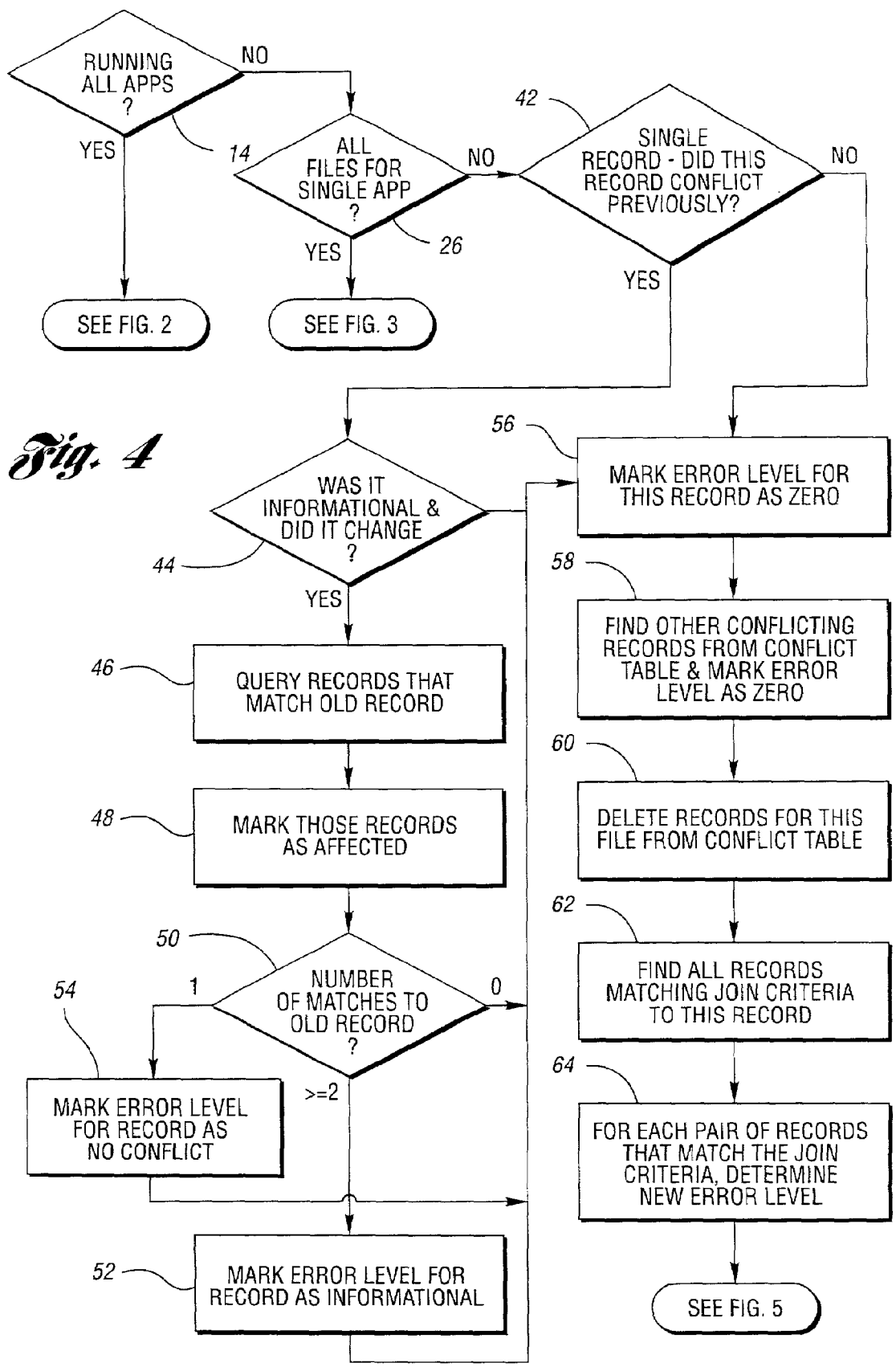
FIG. 4 is a block diagram flow chart which illustrates an algorithm for determining conflicts for a single record in a single application.

Conflicts can be determined by several methods depending on need. The process is different between running conflicts for all applications (FIG. 2), for a single application (FIG. 3), or for a single file in a single application (FIG. 4). The first step for each variation is to clear old conflicts that exist for the application(s) or item that conflicts that existed for the application(s) or item that conflicts are to be run on. Then the new conflicts are found and stored. Errors and warnings are stored in a conflict table that is associated with the particular item. Informational conflicts are only kept with the item that the conflict occurred for. For example, a file with an informational conflict and an error will have one record in a FileConflict table representing the error and will have its own conflict level representing the error and the informational.

Figure 2:
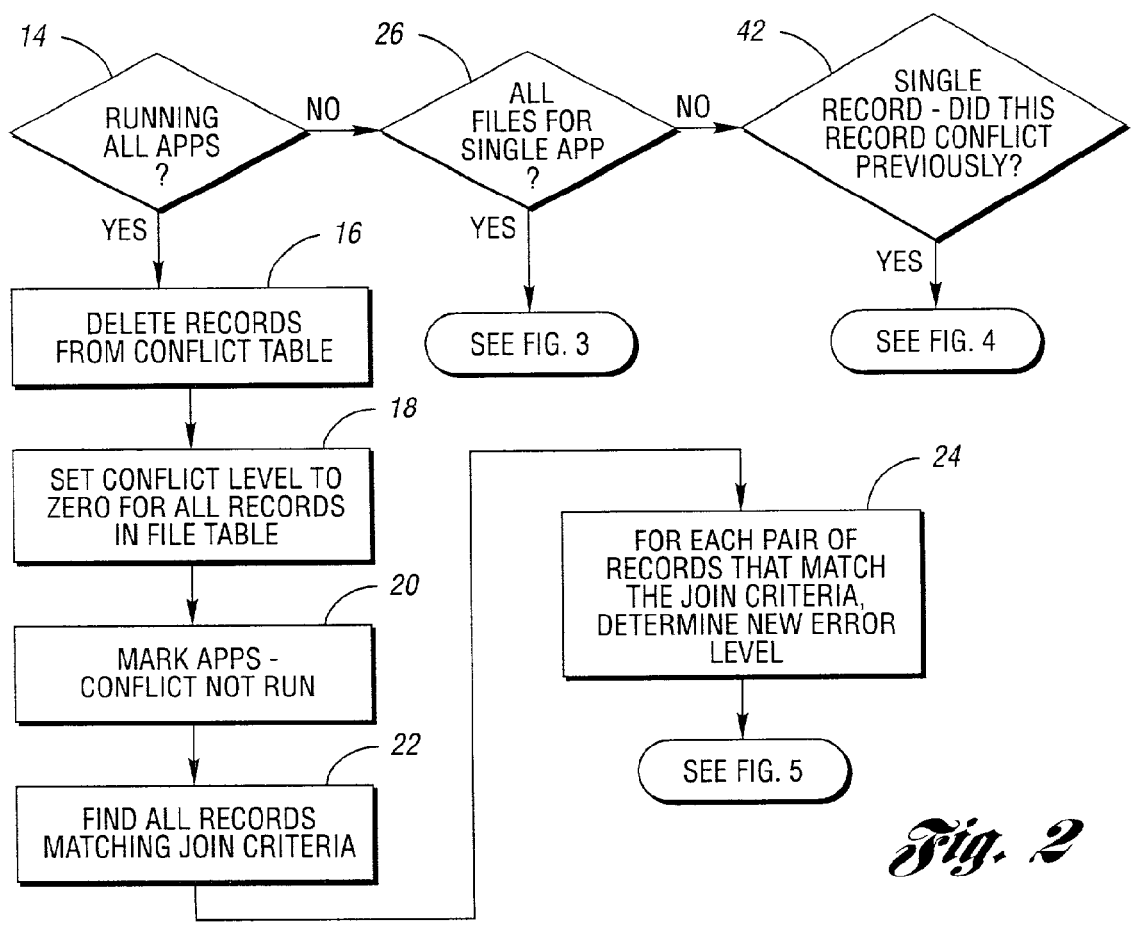
FIG. 2 is a block diagram flow chart which illustrates an algorithm for determining conflicts on applications running on the computer system of FIG. 1.

Referring now to FIG. 2, at block 14, the algorithm tests to determine if conflicts across all applications at one time is to be utilized.

At block 16, the first step is to delete all record of previous conflicts. The application deletes the records from the conflict tables corresponding to the type of conflicts being run. For file conflicts, all items from the FileConflict table are deleted.

At block 18, the application sets the individual item records' conflict level to zero. For files, the Conflict column in the Files table is set to zero for all files.

At block 20, conflicts are marked which have not been run for all applications since, at this point, all traces of conflicts have been deleted and conflicts would need to be rerun if interrupted. This step is done so the user will know what state an application is in.

At block 22, all records matching a conflict join criteria are found. This step gathers records that are similar enough to possibly conflict. Only system resources of different applications are compared. For files, all files of the same destination filename are gathered and analyzed to determine the new conflicts beginning at block 24. Only files that are executable or reside in common directories such as Windows, Program Files, and System are compared.

When running conflicts for a single application (FIG. 3), the process result is the same but the steps are different.

At block 28, all records are found in other applications that currently conflict with files in this application. This is done using the current records in the FileConflict table that contain this application.

For each record that previously conflicted with files in this application, the record key is stored and its current error level is set to zero, as indicated at block 30. Records are temporarily stored throughout the process and written at the end. During later steps, these error levels are modified to contain the ORed values of all conflicts that occur.

At block 32, the records are deleted from the conflict table for this application and at block 34 the individual item records conflict level is set to zero for this application. For files, the conflict column in the Files table is set to zero for all files in this application.

Finally, at block 36, conflicts are marked which have not been run for this application since all traces of conflicts for this application have been deleted. This step is done so the user will know what state an application is in.

At block 38 all records matching the conflict join criteria are found for records against records in this application. This step gathers records that are similar enough to possibly conflict. For files, all files of the same destination filename as files in this application are gathered in this step and then analyzed beginning at block 40.

Referring now to FIG. 4, at block 42 it is determined whether to run conflicts for a single record that has been changed. It is first determined whether this record conflicted with other records before the change.

At block 44, the previous conflict level is determined by looking at the current value of the conflict column for the record. If the record used to conflict before it was changed, at block 44 it is determined if it was an informational conflict and if it changed items that would make it no longer an informational conflict with the same records it had been prior to being changed.

If so, at block 46, the records are queried that previously were informational conflicts with this one by finding all records that match the old data.

Each of these records is then stored as being affected by an informational conflict change at block 48. This distinction will be used to later determine whether informational conflicts were completed for the records.

Depending on the number of records that match the old record, as determined at block 50, different error levels are recorded for these records.

At block 54, if only one matches it, the error level is zero.

At block 52, if more than one record matches, they are each still informational conflicts with each other and the error level is set to informational.

At block 56, this records key is stored and sets its current error level to 0 since all conflicts are recomputed for this record.

At block 58, each record that previously conflicted with this record is stoked and its current error level is set to 0. These are the records that were either errors or warnings with this record previously. For files, these are records referenced in the FileConflict table for this particular file.

At block 60, records for this file are deleted from the FileConflict table.

Finally, at block 62, all records matching the conflict join criteria are found for records against this record. This step gathers records that are similar enough to possibly conflict.

For files, all files of the same destination filename as this file are gathered and then analyzed beginning at block 64.

The beginning of the process to determine the new conflicts begins at blocks 22, 38 and 62 when records that could be conflicts are found by matching join criteria for all files, files of a single application, or a single file.

Figure 5:
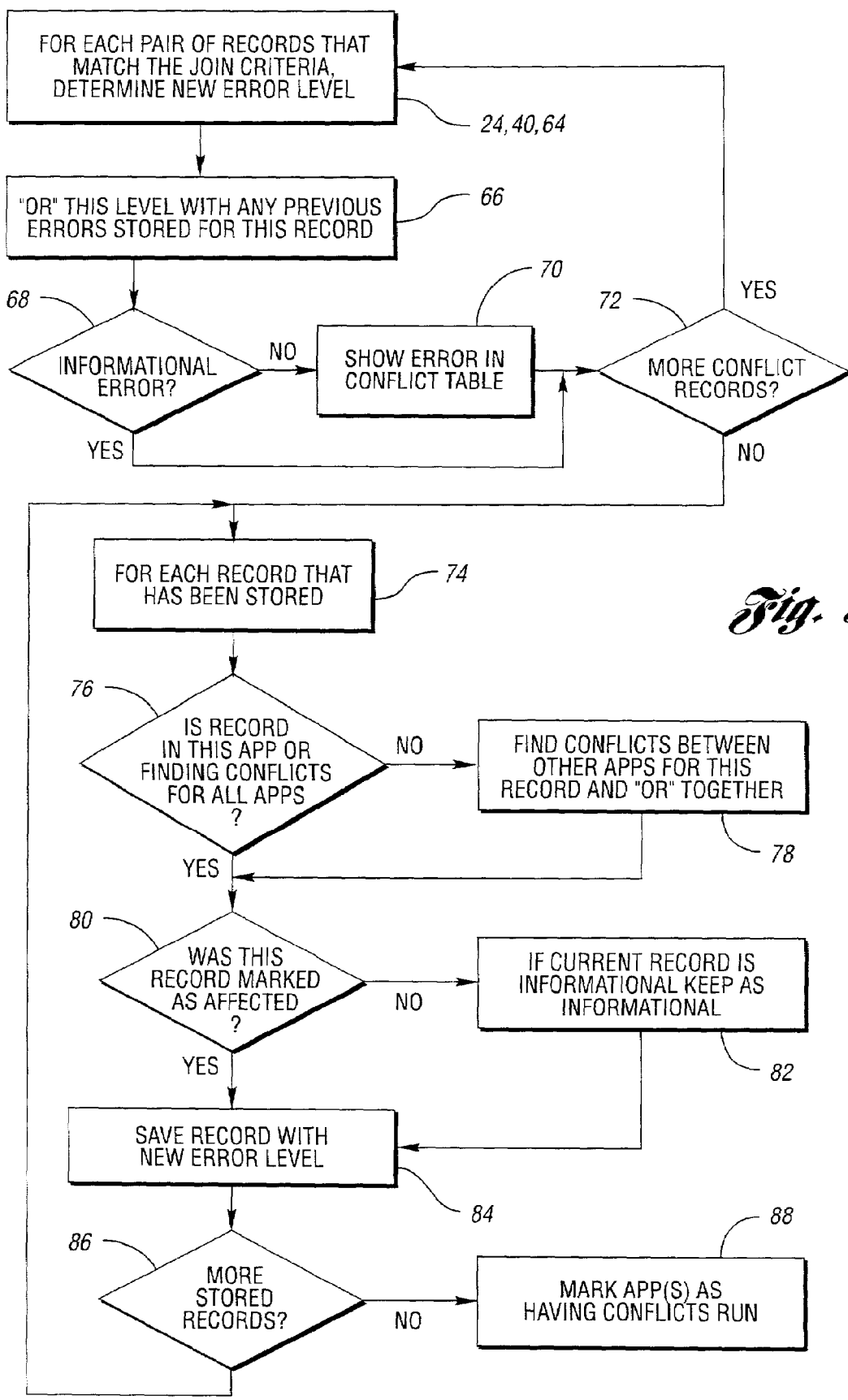
FIG. 5 is a block diagram flow chart which illustrates an algorithm for analyzing the conflicts determined as a result of using the algorithms of FIGS. 2–4.

Referring now to FIG. 5, at blocks 24, 40, 64 (i.e. from FIGS. 2, 3, and 4, respectively), the conflict level between each pair of records that match the join criteria is determined based on other columns in the records. For files, the error level is set to informational initially. If the version, internal version, date/time, or size don't match, and the destination directories match or both files are 16 bit executables, the error level is set to error, otherwise the error level is set to warning.

At block 66, the error levels from the pair records that conflict are ORed with any stored error levels from previous steps for those records' keys.

At block 68, it is determined if the error level is an error or warning.

At block 70, the error in the conflict table is saved. For files, each records' keys are written to the FileConflict table along with the corresponding error level between the two records. This process is repeated for each pair of files found that meet the join criteria as indicated at block 72.

Blocks 76 through 86, for each record that has been stored as indicated at block 74, deal with the stored error levels that have been ORed together in previous steps. If the stored record is not for this application when computing conflicts for a single application or record, at block 78, conflicts for this record are found against records in applications other than the one running conflicts for. These other conflict levels are ORed together with any stored error levels. These conflicts are found using conflicts with other records in the FileConflict table that match records for other applications.

If this record was not marked as affected at block 48, at block 82 the record is recorded to see if it has other informational conflicts by reading the current error level of that record. If so, then the error level is ORed with a one. If the record was marked as affected, the algorithm computes informational conflicts for the record at block 24, 40, 64.

At block 84, the new error level for the record is written to the database. After all stored records have been processed, the application(s) are marked as having had conflicts run.

The above process is repeated for all item types other than files stored in the database. The only difference is how conflicts are actually determined and which table they are stored in. To determine conflicts for registry records, the join criteria is the registry path and key name columns. An error occurs if the first 255 characters of the value, the datatype, or the operation is different between a pair of records that have the same registry path and key name. ODBC drivers are joined by the driver name and whether they are 16 or 32 bit drivers. After the match is made, each attribute of the driver is compared. If an attribute exists for one driver and not the other, it is recorded as a warning. If two attributes exist, but have different values, those attributes are marked as errors.

Figure 6:
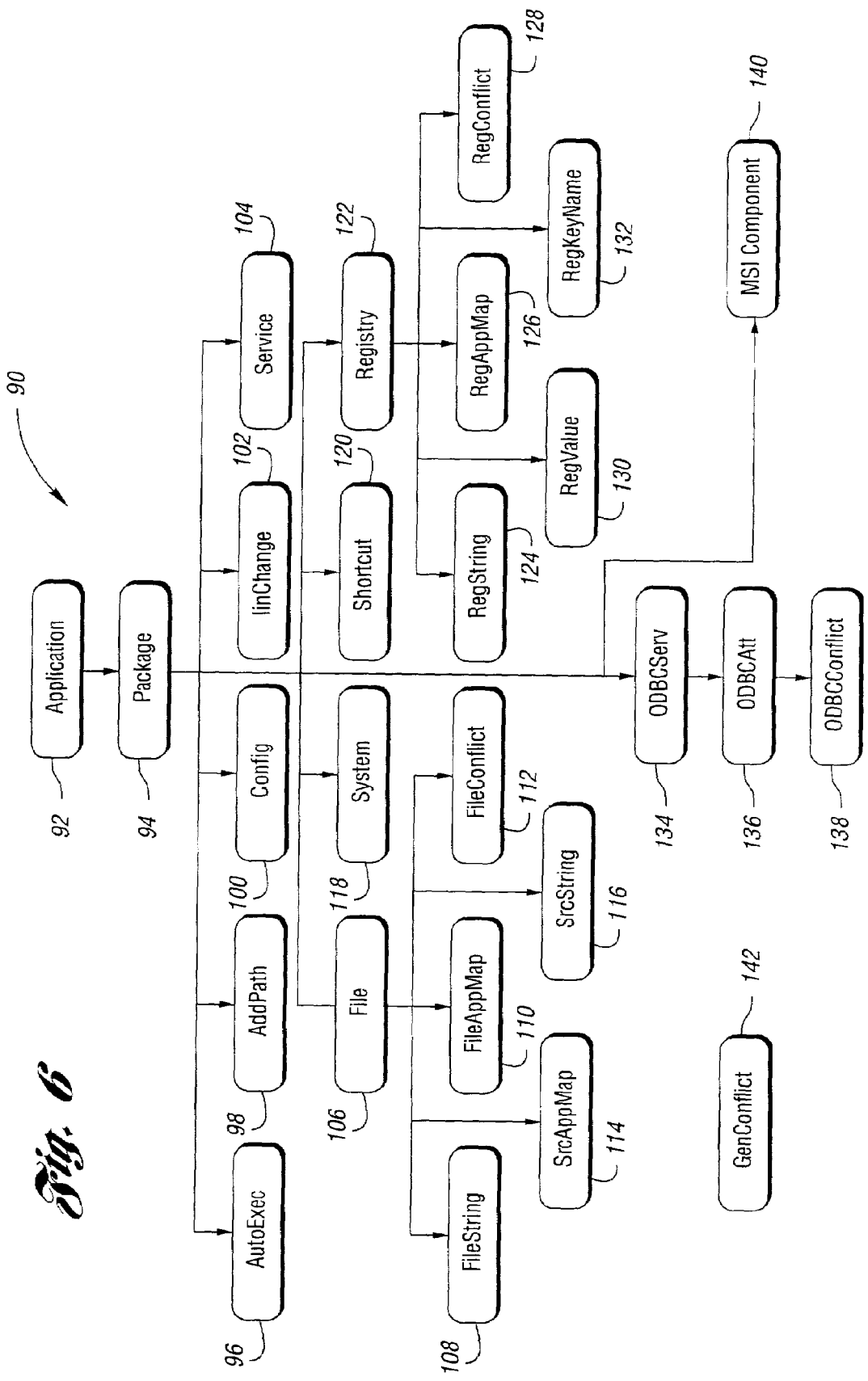
FIG. 6 is a block diagram of the tables of a database of the present invention illustrating table lay out and relationships.

Referring now to FIG. 6, there is illustrated the overall table layout and relationships of a database, generally indicated at 90, that is utilized in the above process. The following information is provided to illustrate how the tables relate to each other.

In general, most tables in the database utilize a conflict field. Entries that are found to conflict require a conflict level indicator in the conflict field. The indicator displays the severity of the conflict. A value of "0" indicates that no conflict was found. A value of "1" is informational (same item exists for another application, default if the match criteria are met), but Warning and Error Criteria are not met. A value of "2" is a Warning. It could cause problems, but not necessarily severe errors. A value of "4" indicates a Severe Error. This error could cause application malfunction.

Conflicts between Microsoft Windows Installer components are also tracked. There is a MSIComponent table which contains component information from a Microsoft Windows Installer database for an install. Also, there is an MSIComponent column in the file, registry, ODBCServ, Shortcut, Service, and INIChange tables which is used to determine the component for each of these resources. MSIComponent conflicts occur when identical resources from the above tables are installed using different component GUIDs.

An Application table 92 supplies each application with a unique number, known as a key, so that the application may be easily identified in other tables. A Package table 94, the Application table's only child, gets its AppKey information from this table 92. The Package table 94 identifies the version of the Application to be compared. All children of the Package table 94 use information supplied by the Application table 92 to identify which data goes with what application.

The purpose of the Application table 92 is to supply each application with a unique number, known as a key, so that the application may be easily identified in other tables. Each field of the Application table 92 performs a unique function. They are listed in Table 1.

TABLE 1

| Field | Data Type | Details | Example |
|---|---|---|---|
| AppKey (pk) | Integer | Provides a unique number, also known as a key, for each application. This key is used to identify the application in other tables. Any application can be assigned any number so long as the number is unique within this table. | 1 3 |
| Application | 50 Characters | This is a text field that allows you to describe the applications to be compared. | (1) Office 97 (3) WordPerfect |

The Package table 94 is the only child of the Application table 92, and in turn, is a parent to most of the other tables. It lists the package information for each compared application to be used as key data for its children. Where the Application table 92 allows one to assign a key number to each application to be compared, the Package table 94 allows one to assign a key to each version of an application. A package can only exist here if it belongs to one of the applications listed in the Application table 92.

A package is a sub-unit of an application. There may be no or several packages within an application. Table 2 indicates Package table fields.

TABLE 2

| Field | Data Type | Details | Example |
|---|---|---|---|
| AppKey (pk) | Integer | Each application to be compared has a unique number. This number is the Application Key (AppKey) and is used to identify this application to all other tables that require an AppKey input. This table uses the AppKey information as its parent identifier. | 1 Office 97 3 WordPerfect |
| PackKey (pk) | Integer | The PackKey indicates the version of the application. Different versions of the same application may be compared for conflicts. | 1 Microsoft Word 3.0 2 Microsoft Word 4.0 |
| Package | 50 Characters | This is the text name of the package. | P1, CorelWPSte |
| Maindir | 255 Characters | This is the package's main installation | Office 97 |
| ScriptLoc | 255 Characters | Original Wise script location for this package | C:\Scripts\Office97.wse |
| Progfiles | Long Integer | If the file is installed under the Program Files folder, there will be an indication of 1 in this field. One being the "true" indication, 0 being the "false" indication. | 0, 1 |

TABLE 2-continued

| Field | Data Type | Details | Example |
|---|---|---|---|
| IGroup | 50 Characters | Icon Group Name | Microsoft Reference, Tools |
| Logfile | 255 Characters | The directory and name of a file generated during the packages installation. This file is commonly used during the package's uninstallation procedure. | %MAINDIR%\Office97\INSTALL.LOG |
| ItemMask | Long Integer | This field is a series of bit masks, with up to 32 different masks possible. Items in this field may be combined. | 1031 1055 |

An AutoExec table 96 is a child of the Package table 94. Its function is to house detailed information about the changes made to the Autoexec.bat. For an entry to exist in this table 96, it must first belong to a package (located in the Package table 94). It is from this package that the AppKey and PackKey information is obtained, along with the data for the detail fields.

Entries that are found to conflict require a Conflict Level indication in the Conflict field. The specific information housed by the AutoExec table 96 and details about each column are listed in Table 3 below.

TABLE 3

| Field | Data Type | Details | Example |
|---|---|---|---|
| AppKey (pk) | Integer | In the case of this table, as well as all other children of the Package table, this field contains one of the parent designators. In this case, the AppKey is used to indicate that the data in this row belongs to a certain application; the application associated with that particular number. | 1 Office 97 3 WordPerfect |
| PackKey (pk) | Integer | The PackKey indicates the version of the application. Different versions of the same application may be compared for conflicts. | 1 Microsoft Word 3.0 2 Microsoft Word 4.0 |
| AutoKey (pk) | Integer | This number establishes the AutoExec table as a unique child of the Package table. The numbers in this field represent particular changes that have occurred to the autoexec.bat. Each change is unique and is therefore assigned a unique number for identification purposes. | 1 2 |
| Path | 255 Characters | The path that leads to the command to run | C:\DOS |
| Command | 255 Characters | This is the actual command to run the file | prompt, mscdex |
| Options | 255 Characters | Command line options | $p$g |
| SearchText | 255 Characters | The data that appears in this column is Wise-specific. It indicates the text to search for when inserting information into the Wise program. | |
| Comment | 255 Characters | This is the user's comment about the change that occurred to the autoexec.bat file | |
| Line | Long Integer | The number of the line within AutoExec.bat that was modified. | 42 |
| Flags | Long Integer | There are three flags used in this table. Each indicates a different search option. | 1, 2, 4 |
| Component | 128 | Represents a change to a component of a program. This field contains the component string for reference to the component table. Currently, this field pertains to changed files only. | Microsoft Excel is a program and Help is one of its components |

TABLE 3-continued

| Field | Data Type | Details | Example |
|---|---|---|---|
| Conflict | Integer | Synonymous with Clevel (conflict level); the number appearing in this column holds a significant message about the severity of the conflict. An Error needs to be indicated in this field if there is a discrepancy on the command line match. Errors result if there is a discrepancy in Path or Options. When this field has a value >0, the programmer knows that a conflict has occurred with another path. Both paths should have conflict indications in this field. | 0, 1, 2, 4 |

An AddPath table 98 is a child of the Package table 94. Its function is to house detailed information about all paths for all compared applications. For a path entry to exist in this table 98, it must first belong to a package (located in the Package table 94). It is from this package that the AppKey and PackKey identifiers are found, along with other data for the detail fields.

Paths that are found to conflict require a Conflict Level indication in the Conflict field of this table 98. The specific information housed by the AddPath table and details about each column are listed in Table 4 below.

TABLE 4

| Field | Data Type | Details | Example |
|---|---|---|---|
| AppKey (pk) | Integer | In the case of this table, as well as all other children of the Package table, the number in this field indicates one of parent designators. The AppKey is used to indicate that the data in this row belongs to a certain application. | 1 Office 97<br>3 WordPerfect |
| PackKey | Integer | The PackKey indicates the version of the application. Different versions of the same application may be compared for conflicts. | 1 Microsoft Word 3.0<br>2 Microsoft Word 4.0 |
| PathKey (pk) | Long Integer | This number establishes AddPath entries table as unique children of the Package table. | 1<br>2 |
| Directory | 255 Characters | This is the directory for a particular path. | c:\My Documents; c:\Program Files; c:\temp, etc . . . |
| Component | 128 Characters | A component is one particular file within an application. For instance, in Microsoft Excel is a program and Help is one of its components. | Microsoft Excel is a program and Help is one of its components. |
| Conflict | Integer | Synonymous with Clevel (conflict level); the number appearing in this column holds a significant message about the severity of the conflict. A conflict indication results in this table if an error match is found on the Directory. When this field has a value >0, the programmer knows that a conflict has occurred with another path. Both paths should have conflict indications in this field. | 0, 1, 2, 4 |

A Config table 100 is also a child of the Package table 94. Its function is to house detailed information about all changes to Config.sys. For an entry to exist in this table, it must first belong to a package (located in the Package table 94). It is from this package that the AppKey and PackKey data is obtained, along with data for the detail fields.

Entries that conflict require a Conflict Level indication in the Conflict field as indicated in Table 5 below.

TABLE 5

| Field | Data Type | Details | Example |
|---|---|---|---|
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| ConfKey (pk) | Integer | Each configuration is assigned a unique number that identifies it. This number is known as a key. Combined with the AppKey and PackKey information, a specific configuration file can be portrayed numerically in other tables. | 1 ,2, 28, 29, etc. |
| Path | 255 Characters | This is a list of directories that will be added to the path during installation. | C:\DOS |
| Entry | 255 Characters | This is the device or function affected by the configuration file. | Device, buffers |
| Command | 255 Characters | This is the command that initiates the device or function. It is characterized as the text that occurs after the equal sign (=). | 386.vxd |
| Options | 255 Characters | Command line options | /D:CPQCDROM |
| Search Text | 255 Characters | The data that appears in this column is Wise-specific. It indicates the text to search for when inserting information into the Wise program. | |
| Comment | 255 Characters | This is the user's comment about the change that occurred to the autoexec.bat file. | |
| Line | Long Integer | The number of the line within Config.sys that was modified. | |
| Flags | Long Integer | This field may contain any of a series of bit flags, with up to 32 flags possible. Flags in this field may be combined. | 1, 2, 4, 6 |
| Component | 128 Characters | This is a text entry name of the affected component. A component is one particular file within an application. | Microsoft Excel is a program and Help is one of its components. |
| Conflict | Integer | Synonymous with Clevel (conflict level); the number appearing in this column holds a significant message about the severity of the conflict. A match is conducted with Command and Entry files. An error is logged in this table when Path or Options don't match. When this field has a value >0, the programmer knows that a conflict has occurred with another path. Both paths should have conflict indications in this field. | 0, 1, 2, 4 |

An IniChange table 102 is a child of the Package table 94, houses all changes to INI files. Each record in this table 102 represents a single entry in a single section in a single INI file.

INI files are vital to program function, therefore, any INI file changes that have logged a conflict need to have an indication in that file's Conflict field. Table 6 below indicates this table's fields.

TABLE 6

| Field | Data Type | Details | Example |
|---|---|---|---|
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| IniKey (pk) | Integer | Each INI file has a unique number that identifies it. This number is known as a key. The IniKey combined with the AppKey and PackKey information can portray a file numerically in other tables. | 1, 2, 28, 29, etc. |
| Path | 255 Characters | The directory in which the modified INI file resides. | Example for Application 1: Microsoft Office\OF97SPEC.INI Example for Application 2: \Corel\Suite8\Programs\PFT.INI |
| Section | 255 Characters | This is the INI file's section name. Notice that these appear in square brackets. | [MAPI = 1]<br>[Printer Map] |
| Entry | 255 Characters | This is the entry name; the device or function affected by the INI file. It is the wording on the left side of the equal sign: MAPI = 1 | MAPI<br>HP LaserJet IID Postscript |
| EValue | 255 Characters | This is the Entry Value. It is the number on the right side of the equals sign: MAPI = 1 | 1<br>PostScript |
| Component | 128 Characters | This is a text entry name of the affected component. A component is one particular file within an application. | Microsoft Excel is a program and Help is one of its components. |
| Conflict | Integer | Synonymous with Clevel (conflict level); the number appearing in this column holds a significant message about the severity of the conflict. To determine in an INI file conflict has occurred, a match is run on Path, Section, and Entry. An error is evident if there is a difference in any of these values. When this field has a value >0, the programmer knows that a conflict has occurred with another path. Both paths should have conflict indications in this field. | 0, 1, 2, 4 |

A Service table 104 is also a child of the Package table 94. Its function is to house detailed information about all services installed as part of a package. For a file to exist in this table 104, it must first belong to a package (located in the Package table 94). It is from this package that the AppKey and PackKey information is obtained, along with data for the detail fields.

Service files that are found to conflict require a Conflict Level indication in the Conflict field as indicated in Table 7 below.

TABLE 7

| Field | Data Type | Details | Example |
|---|---|---|---|
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| ServKey (pk) | Long Integer | A service file is another sub-unit of a package. There may be none or several service files within a package. Each service file has a unique number that identifies it and provides information to other tables that require ServKey information. | 1, 2, 28, 29, etc. |
| Name | 255 Characters | Text entry of the service name | Regedit |
| DisplayName | 128 Characters | The display name is the name used in dialogs | Regedit |
| Path | 255 Characters | This is the path that leads to this row's service file. | %MAINDIR%\Regedit.exe |
| UserName | 255 Characters | Lists the service user's name. | |
| Password | 255 Characters | Case sensitive, text and numeric password for the service. | |
| SType | Long Integer | Each service type has a unique code assigned to it for easy identification. | 1, 2, 16, 32 |
| BType | Long Integer | This field identifies the different run types by assigning a unique number to each. | 0, 1, 2, 3, 4 |
| EType | Long Integer | Service errors are rated by severity. | 0, 1, 2, 3 |
| Component | 128 Characters | This is a text entry name of the affected component. A component is one particular file within an application. | Microsoft Excel is a program and Help is one of its components. |
| Conflict | Integer | Synonymous with Clevel (conflict level); the number appearing in this column holds a significant message about the severity of the conflict. To determine if there is a service error, a match is run on Name or Path. When this field has a value >0, the programmer knows that a conflict has occurred with another path. Both paths should have conflict indications in this field. | 0, 1, 2, 4 |

A File table 106 is another child of the Package table 94. Its function is to house detailed information about all files installed as part of a particular version of an application, known as a Package. For a file to exist in this table, it must first belong to the applicable version of the software being compared (the package located in the Package table 94). It is from this package that the AppKey and PackKey identifiers are obtained, along with data for the detail fields.

Files that are found to conflict require a Conflict Level indication in the Conflict field. This indication and pertinent file data are used to compile a FileConflict table 112 described below.

The specific information housed by the File table 106 and details about each column are listed in Table 8 below.

TABLE 8

| Field | Data Type | Details | Example |
|---|---|---|---|
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97<br>3 WordPerfect |

TABLE 8-continued

| Field | Data Type | Details | Example |
|---|---|---|---|
| PackKey (pk) | Integer | The PackKey indicates the version of the application. Different versions of the same application may be compared for conflicts. | 1 Microsoft Word 3.0<br>2 Microsoft Word 4.0 |
| FileKey (pk) | Long Integer | A file is a sub-unit of a package. There may be none or several files within a package. Each file has a unique number that identifies it here and in other tables that require FileKey information. | 1, 2, 28, 29, etc. |
| SrcStringID | Long Integer | Source path tree. | 3, 4, 68, 69 |
| Sourcename | 255 Characters | This field is filled in only when the file name differs from the name of the source string. The file name and extension are listed. | |
| StringID | Long Integer | Destination path tree. | Numbered in sequence, 1, 2, 3, or 145, 146, 147 |
| Filename | 255 Characters | This is the unique file name. | Green Design1.wpg |
| Description | 255 Characters | Description of the unique file. | |
| Size | Long Integer | File size in bytes | 340, 183646, 2271, etc. |
| DTime | 16 Characters | This is a date/time field. The first 8 digits are the specific date the file was modified (CCYYMMDD) in Wise. The 6-digit number is a 24-hour clock indication of the time the file was created or modified (HHMMSS). | 19970509 080000 means 1997, May 9th at 08:00 am and 00 seconds. |
| Version | 32 Characters | This is the version of a file. The version numbers are digits separated by periods, for instance, 4.00.993.0 or 8.0.0.153. Note that not all files will have version numbers. The version numbers are reserved for files such as .exe, .dll, .ocx, etc. | 4.40.8371374<br>8.0.0.153<br>4.00.993.0 |
| VersionMS | Long Integer | Most significant WORD of the file version DWORD. | 1953046560 |
| VersionLS | Long Integer | Least significant WORD of the file version DWORD. | 540700005 |
| Company | 255 Characters | Company that produced the file (Version Resource) | Microsoft Corporation |
| Product | 255 Characters | Name of the product the file is for (Version Resource) | Microsoft Word |
| Type | Long Integer | This field is a series of bit flags that describe file types. There are up to 32 flags possible. Entries in this field may be combined. | 0, 1, 16, 17 (16 + 1), 32, 33, (32 + 1), etc. |
| Flags | Long Integer | This field is a series of bit flags, with up to 32 flags possible. Flags in this field may be combined. Each flag pertains to a Wise instruction. | 130, 131, 642, 643, 4227, 4739 |
| Components | 128 Characters | This is a text entry name of the affected component. A component is one particular file within an application. | Microsoft Excel is a program and Help in one of its components. |
| Conflict | Integer | Synonymous with Clevel (conflict level); the number appearing in this column holds a significant message about the severity of the conflict. Looking for a match on Filename: A Warning indication needs to be set if different 32 bit files occur in different directories. An error indication needs to be set if different 16 bit files occur in different directories, or if they occur in the same directory but with a different Size, Version, VersionMS, VersionLS, or DTime.<br>When this field has a value >0, the programmer knows that a conflict has occurred with another file. Both files should have conflict indications in this field. | 0, 1, 2,4 |

A FileString table 108, a child of the File table 106, is a centralized, hierarchical database of strings that are the destination paths for files. All file strings are listed, and their parent is identified in the ParentID column of this table 108.

Each section of the file path is assigned a number value. The value of −1 in the Parent column indicates that one is looking at the parent, in this case, C:. The value of 1 indicates that this section's parent is whichever parent has been assigned the number 1 in the ID column. In this case, the parent again is C:. System's parent is not C:. System's parent is 2, which is Windows in this example.

Table 9 illustrates the table's fields.

TABLE 9

| Field | Data Type | Details | Example |
| --- | --- | --- | --- |
| StringID | Long Integer | Provides a unique number for each string to be used as a StringID key. | 1, 2, 3, etc. |
| SText | 255 Characters | This is a text entry field that lists the file types associated with this string. | Microsoft Reference, Artgalry, Orgchart, etc. |
| ParentID | Long Integer | This column helps you quickly identify the file's parent. There are no values of 0 in this column because every entry has a parent, or is a parent. | −1, 1, 30, 31, 170, 171, etc. |

A FileAppMap table 110 is a child of the File table 106. The FileAppMap table 110 helps one identify which file strings go with which application. Directory paths are broken down and each section is given an identifier to conserve space. Table 10 contains detailed information about the FileAppMap table fields.

TABLE 10

| Field | Data Type | Details | Example |
| --- | --- | --- | --- |
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| StringID | Long Integer | Source path tree. | 3, 4, 68, 69 |
| ParentID | Long Integer | This column helps you quickly identify the file's parent. There are no values of 0 in this column because every entry has a parent, or is a parent. | −1, 1, 30, 31, 170, 171, etc. |

The FileConflict table 112 is a child of the File table 106. A file must exist in the File table 106 and have a number greater than zero in the File table Conflict field before it can be entered into the FileConflict table 112. The FileConflict table 112 receives its AppKey, PackKey, and FileKey information from the File table entries (AppKey1, AppKey2, etc.). Because a conflict is a result of a comparison, the conflicting files from compared applications need to appear in the FileConflict table 112. This table 112 hold pairs of conflicting files. Given any one file, you may utilize this table to identify all files that conflict with it. Distinguishing one file from another is accomplished by entering all data pertinent to the first file in only the fields with a 1 parent designator. All of the table's fields, with the exception of CLevel, contain such designators to identify the conflicting files. The key number of the first compared application is entered in the AppKey 1 field, then the key number of application 1's affected package is entered in the PackKey 1 field. Finally, the key number of the affected file is entered in the FileKey 1 field. The database now knows exactly which is the first file that has a conflict. To identify the second conflicting file, fill in the AppKey2, PackKey2, and FileKey 2 fields.

The FileConflict table 112 contains a field called CLevel. The CLevel (conflict level) indicates the severity of the conflict. In this table 112 only conflict levels 2 and 4 are used. If there were no conflicts with this file (value of 0), the file would not appear in this table in the first place. This table 112 is reserved for the two most crucial types of conflicts, Warnings (the value of 2) and Severe Errors (value of 4).

Table 11 indicates the fields of this table.

TABLE 11

| Field | Data Type | Details | Example |
|---|---|---|---|
| AppKey (pk) | Integer | This field identifies the first of the compared applications. The application key number is entered here. | 1 Office 97, or any other application assigned to this number |
| PackKey (pk) | Integer | The PackKey indicates the version of the application. Different versions of the same application may be compared for conflicts. | 1 Microsoft Word 3.0<br><br>2 Microsoft Word 4.0 |
| FileKey1 (pk) | Long Integer | This field identifies the specific conflicting file within a package. The application designator, in this case 1, indicates that this file belongs to the first of the compared applications. The actual file key number is entered here. | 2 This number corresponds to the number assigned to a particular file within the package. |
| AppKey2 (pk) | Integer | This field identifies the second of the compared applications. The application key number is entered here. | 3 Corel WordPerfect Suite, or any other application assigned to this number |
| PackKey2 (pk) | Integer | The PackKey indicates the version of the application. Different versions of the same application may be compared for conflicts. | 1 Microsoft Word 3.0<br><br>2 Microsoft Word 4.0 |
| FileKey2 (pk) | Long Integer | This field identifies the specific conflicting file within a package. The application designator, in this case 2, indicates that this file belongs to the second of the compared applications. The actual file key number is entered here. | 1 This number corresponds to the number assigned to a particular file. |
| CLevel | Integer | Synonymous with Conflict; the number appearing in this column holds a significant message about the severity of the conflict.<br><br>In this table, only conflict levels 2 and 4 are used. If there were no conflict with this file (value of 0), the file would not appear in this table in the first place. This table is reserved for the two most crucial types of conflicts, Warnings (the value of 2) and Severe Errors (value of 4).<br><br>When this field has a value >0, the programmer knows that a conflict has occurred with another path. Both paths should have conflict indications in this field. | 2, 4 |

A SrcAppMap table 114, a child of the File table 106, contains detailed information about the SrcAppMap table fields. The SrcAppMap table 114 helps one identify which file source strings go with which source. Directory paths are broken down and each section is given an identifier to conserve space. For example, C:\Windows\System can simply be identified as 3. The data in the rows themselves make up their own keys. The code concept behind the StringID field is such that each section of the file path is assigned a number value. A value of 3 occurring in the StringID column shows that the relative path is C:\Windows\System. However, if a value of 2 occurs, one knows that the relative path is C:\Windows. The value of −1 in the Parent column indicates that one is looking at the parent, in this case, C:. The value of 1 indicates that this section's parent is whichever parent has been assigned the number 1 in the ID column. In this case, the parent again is C:. System's parent is not C:. System's parent is 2 which is Windows in this example.

TABLE 12

| Field | Data Type | Details | Example |
|---|---|---|---|
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| StringID | Long Integer | Source path tree | 3, 4, 68, 69 |
| ParentID | Long Integer | This column helps you quickly identify the file's parent. There are no values of 0 in this column because every entry has a parent, or is a parent. | −1, 1, 30, 31, 170, 171, etc. |

The SrcString Table 116, another child of the File table 106, is a centralized, hierarchical database of strings. Each string can be assigned a unique code for the purpose of saving string space. Each section of the file path is assigned a number value. The value of −1 in the Parent column indicates that one is looking at the parent, in this case, C:. The value of 1 indicates that this section's parent is whichever parent has been assigned the number 1 of the ID column. In this case, the parent again is C:. System's parent is not C:. System's parent is 2, which is Windows in this example. To quickly define the path C:\Windows\System, all one would have to indicate in this data field would be the code 3.

Table 13 below indicates this table's fields.

TABLE 13

| Field | Data Type | Details | Example |
|---|---|---|---|
| StringID | Long Integer | Provides a unique number for each string to be used as a StringID key. There can never be a value of 0 in this field because all entries in this table relate to a specific file string. | 1, 2, 3, etc. |
| SText | 255 Characters | This is a text entry field that lists the file types associated with this string. | Corel User Files, AppMan, Textures |
| ParentID | Long Integer | The entry that is the parent to this entry is listed here by its ID number (ParentID). | −1, 1, 30, 31, 170, 171, etc. |

A System table 118 is a child of the Package table 94. Its function is to house detailed information about all device driver files. For a file to exist in this table 118, it must first belong to a package (located in the Package table 94). it is from this package that the AppKey and PackKey data is obtained.

Conflicting System files require a Conflict Level indication in the Conflict field. The specific information about the System table 118 and details about each field are listed in Table 14.

TABLE 14

| Field | Data Type | Details | Example |
| --- | --- | --- | --- |
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| SysKey (pk) | Long Integer | Each system file requires a unique number to identify it from other system files. This information, along with the AppKey and PackKey data is used to uniquely identify this system file to other tables that may require this data. | 1, 2, 3, etc. |
| Device | 255 Characters | The path and filename of the device driver file. | C:\DOS |
| Component | 128 Characters | This is a text entry name of the affected component. A component is one particular file within an application. | Microsoft Excel is a program and Help is one of its components. |
| Conflict | Integer | Synonymous with Clevel (conflict level); the number appearing in this column holds a significant message about the severity of the conflict. When this field has a value >0, the programmer knows that a conflict has occurred with another system file. Both files should have conflict indications in this field. | 0, 1, 2, 4 |

A Shortcut table 120, a child of the Package table 94, houses all shortcuts and shortcut information for the installed applications. A file cannot exist in this table 120 unless it belongs to a package. It is from this package that the AppKey and PackKey data is obtained.

If a conflict occurs between two shortcuts, an indication is given in the Conflict field of Table 15.

TABLE 15

| Field | Data Type | Details | Example |
| --- | --- | --- | --- |
| AppKey (pk) | Integer | Each application to be compared has a unique number. This number is the Application Key (AppKey) and is used to identify this application to all other tables that require an AppKey input. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |

TABLE 15-continued

| Field | Data Type | Details | Example |
|---|---|---|---|
| ShortKey (pk) | Long Integer | A shortcut is part of a package. There may be none or several shortcuts within a package. Shortcuts reside on the desktop and, when double-clicked, initiate the desired program's executable file. Each shortcut has a unique number that identifies it here, and in any other table requiring ShortKey information. | 1, 2, 28, 29, etc. |
| Source | 255 Characters | This is the path that leads to the file that the shortcut will execute. No command line arguments should be included in this entry. | %MAINDIR%\Microsoft Office\Office\MSACCESS.EXE |
| Destination | 255 Characters | This is the human readable text shown on the desktop for the shortcut. | Microsoft Access |
| Location | Long Integer | This is a 2-digit number code for specifying the location of the icon. | 16, 17, 18, 19, 20 |
| Options | 255 Characters | The parameters passed to the program being launched from the shortcut. | -b, -n, -p |
| Workdir | 255 Characters | This is the directory that the launched program should startup within. Commonly this affects the program's ability to find needed files. | %MAINDIR%\Microsoft Office\Office |
| Iconnum | Long Integer | This is the number of the icon for a particular program. It is an index into the list of icons contained in the file named by IconPath. | 0, 1, 2, etc . . . |
| IconPath | 255 Characters | This is the path and filename of a file containing the icon to be shown on the desktop for the shortcut. This may name an .exe, .dll, or even an .ico file. | %MAINDIR%\Microsoft Office\Office\OSA.EXE |
| FileKey | Long Integer | If this shortcut refers to a file in this application, this field refers to that file in the files table | 1 , 2, 3, etc. |
| Component | 128 Characters | This is a text entry name of the affected component. A component is one particular file within an application. | Microsoft Excel is a program and Help is one of its components. |
| Conflict | Integer | Synonymous with Clevel (conflict level); the number appearing in this column holds a significant message about the severity of the conflict. Conflicts with shortcuts are determined by running a match on the same Destination and Location, and the same Icon Group in the Package Table. An error results if there is not a match on Source, Options, Workdir, Iconnum, or Iconpath. When this field has a value >0, the programmer knows that a conflict has occurred with another path. Both paths should have conflict indications in this field. | 0, 1, 2, 4 |

A Registry table 122 is a child of the package table 94. Its function is to house detailed information about all registry entries in a package. For an entry to exist in this table, it must first belong to a package (located in the Package table). It is from this package that the AppKey and PackKey information is obtained, along with data for the lesser fields.

Registry entries that are found to conflict require a Conflict Level indication in the Conflict field as indicated in Table 16. This indication and pertinent entry data are used to compile a RegConflict table 128 described below, a child of the Registry table 122.

TABLE 16

| Field | Data Type | Details | Example |
| --- | --- | --- | --- |
| AppKey (pk) | Integer | Each application to be compared has a unique number. This number is the Application Key (AppKey) and is used to identify this application to all other tables that require an AppKey input. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| RegKey (pk) | Long Integer | A registry is another sub-unit of a package. There may be none or several registry files within a package. Each registry file has a unique number that identifies it in other tables that require RegKey information. | 1, 2, 28, 29, 1245, 1246, etc. |
| StringID | Long Integer | Reference to the RegString table, giving the name of the registry key being represented. | 7, 8, 458, 459, 6892, 6893, etc. |
| NameKey | Long Integer | Reference to the RegKeyName table, giving the name of the registry key being represented. | 3, 7, 243, etc. |
| Type | Integer | This field is a series of bit flags that describe file types. There are up to 32 flags possible. Entries in this field may be combined. | 0, 3 |
| RValue | 255 Characters | Value of the registry entry. | doc, WordPerfect 6.x, Yes, No, 4005, %MAINDIR%\Corel\Suite8\Shared\IDAPI |
| ValueKey | Long Integer | Reference to RegValue table, giving the rest of a registry value that is longer than 255 characters | 6, 87, 342, etc. |
| Operation | Long Integer | Operations are key and value instructions. Each operation has a code for quick reference. | 0, 1 |
| Component | 128 Characters | This is a text entry name of the affected component. A component is one particular file within an application. | Microsoft Excel is a program and Help is one of its components. |
| Conflict | Integer | Synonymous with Clevel (conflict level; the number appearing in this column holds a significant message about the severity of the conflict. To determine if a conflict exists with a registry file, a match is conducted on NameKey and StringID. An error exists if a different Value, Operation, or Type occurs. When this field has a value >0, the programmer knows that a conflict has occurred with another path. Both paths should have conflict indications in this field. | 0, 1, 2, 4 |

A RegString table 124 provides centralized storage of registry key names. Entries are stored in a hierarchical fashion using a self-referencing ParentID column. The ParentID relates to other sections of a file path for efficient identification. Each section of the file path is assigned a number value. The value of −1 in the Parent column indicates that you are looking at the parent, in this case C:. The value of 1 indicates that this sections' parent is whichever parent has been assigned the number 1 in the ID column.

Table 17 shows the details of the fields of this table 124.

TABLE 17

| Field | Data Type | Details | Example |
| --- | --- | --- | --- |
| StringID | Long Integer | Provides a unique number for each string to be used as a StringID key. | 1, 2, 3, etc. |
| SText | 255 Characters | This is a text entry field that lists the different registry file types associated with this string. | Printable, .oss, .pot, .ppt, AuxUserType, etc. |
| ParentID | Long Integer | This column helps you quickly identify the registry file's parent. There are no values of 0 in this column because every entry has a parent, or is a parent. | −1, 1, 30, 31, 170, 171, etc. |

A RegAppMap table 126 lists all registry strings in both compared applications. Coding the registry path makes locating registry paths efficient. Registry paths are broken down and each section is given an identifier. The end result is a single number that represents an entire path such that C:\Windows\System can simply be identified as 3. The data in the rows themselves make up their own keys.

Table 18 contains detailed information about the RegAppMap table fields.

TABEL 18

| Field | Data Type | Details | Example |
| --- | --- | --- | --- |
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| StringID | Long Integer | Each section of a path is assigned a number. Each number quickly identifies a unique path. | 1, 2, 28, 29, 65, 66, etc. |
| ParentID | Long Integer | This column helps you quickly identify the registry file's parent. There are no values of 0 in this field because every entry has a parent, or is a parent. | −1, 1, 30, 31, 170, 171, etc. |

A RegConflict table 128 is the child of the Registry table 122, and therefore has three parent identifiers: the AppKey, PackKey, and RegKey. The function of the RegConflict table 128 is to list all registry entries that have been identified as having conflicts. An entry must exist in the Registry table 122 and have a number greater than zero in the Registry table Conflict field before it can be entered into the RegConflict table 128.

The RegConflict table 128 receives its AppKey, PackKey, and RegKey information from the Registry table entries (AppKey1, AppKey2, etc.). Because a conflict is a result of a comparison, the conflicting entries from both applications need to appear in the RegConflict table 128.

Distinguishing one conflicting registry entry from another is accomplished by entering all data pertinent to the first entry in only the fields with a 1 parent designator. All of the table's fields, with the exception of CLevel, contain such designators to identify the conflicting entries. The key number of the first compared application is entered in the AppKey1 field, then the key number of application 1's package is entered in the PackKey1 field. Finally, the key number of the affected registry file is entered in the RegKey1 field. The database now knows exactly which is the first file that has a conflict. To identify the second conflicting file, fill in the AppKey2, PackKey2, and RegKey2 fields.

Table 19 contains detailed information about the RegConflict table fields.

TABLE 19

| Field | Data Type | Details | Example |
|---|---|---|---|
| AppKey1 (pk) | Integer | This field identifies the first of the compared applications. The application key number is entered here. | 1 Office 97 |
| PackKey1 (pk) | Integer | The PackKey indicates the version of the application. Different versions of the same application may be compared for conflicts. | 1 Microsoft Word 3.0<br>2 Microsoft Word 4.0 |
| RegKey1 (pk) | Long Integer | This field identifies the specific conflicting registry entry within a package. The application designator, in this case 1, indicates that this entry belongs to the first of the compared applications. The actual entry key number is entered here. | 2 meaning the second registry file within the package |
| AppKey2 (pk) | Integer | This field identifies the second of the compared applications. The application key number is entered here. | 3 WordPerfect |
| PackKey2 (pk) | Integer | The PackKey indicates the version of the application. Different versions of the same application may be compared for conflicts. | 1 Microsoft Word 3.0<br>2 Microsoft Word 4.0 |
| RegKey2 (pk) | Long Integer | This field identifies the specific conflicting registry entry within a package. The application designator, in this case 2, indicates that this entry belongs to the second of the compared applications. The actual entry key number is entered here. | 1 meaning the first registry file within the package |
| CLevel | Integer | Synonymous with Conflict; the number appearing in this column holds a significant message about the severity of the conflict. When this field has a value >0, the programmer knows that a conflict has occurred with another path. Both paths should have conflict indications in this field. | 2, 4 |

A RegValue table 130 holds blocks of up to 255 characters for registry values that are over 255 characters long. The first 255 characters are kept in the Registry Table and further extensions of that value are kept in this table. This allows for indefinite length registry values to be kept in the lowest common character field size. The RegValue is listed as Table 20 below.

TABLE 20

| Field | Data Type | Details | Example |
|---|---|---|---|
| ValueKey (pk) | Long Integer | Each registry value extension is assigned a unique number for expedient identification. | 1, 2, 88, 89, 1000, 1001, etc. |
| StartKey | Long Integer | The first ValueKey used for this registry value. This is to obtain all RegValue rows for a single key in one query. | 1, 2, 308, 997, etc. |
| RegValue | 255 Characters | Up to 255 characters of the registry value. | 0110111101110100 1111, CLSID's |
| NextKey | Long Integer | If the value continues on past 255 characters, the following row in the RegValue table. References ValueKey. | 66, 763, 1433, etc. |

A RegKeyName table 132 holds registry key names and allows one to assign each a value. This value allows registry files to be quickly identified, and therefore increase conflict resolution speed and decrease string spaced used. Detailed information about each field in the RegKeyName table is in Table 21.

TABLE 21

| Field | Data Type | Details | Example |
|---|---|---|---|
| NameKey (pk) | Number | Each registry key is assigned a unique number for expedient identification. | 1, 2, 88, 89, 1000, 1001, etc. |
| ValueName | 255 Characters | This is the text name of the registry Key. | Quick Type, Date Format Enable Reference Checker |

A ODBCServ table 134, a child of the Package table 94, lists all drivers, data sources, and their managers. This data is broken down farther into driver attributes in a ODBCAtt table 136, which is a child of this table 134.

Detailed information about each field of the ODBCServ table 134 is in Table 22.

TABLE 22

| Field | Data Type | Details | Example |
|---|---|---|---|
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97 3 WordPerfect |
| PackKey (pk) | Integer | The PackKey indicates the version of the application. Different versions of the same application may be compared for conflicts. | 1 Microsoft Word 3.0 2 Microsoft Word 4.0 |
| ODBCKey (pk) | Long Integer | The number in this field represents the unique identifier for a particular driver. No two of these fields should be alike. This information is used in the ODBCAtt table to distinguish which attributes go with which drivers. | 1, 2, 9, 10, etc. |
| Manager | 255 Characters | This is the text name of a driver's manager. | ODBC_MANAGER Text Files |
| Driver | 255 Characters | Text names of each driver appear in this field. File-type designators in parenthesis typically follow the text. | Microsoft Excel Driver (*.xls) Microsoft Text Driver (*txt; *csv) |
| Component | 128 Characters | This column is not currently used in this table. | Not used |
| Flags | Long Integer | The flag indications in this field indicate whether the ODBC is a data source or a driver. These codes are ConflictManager ™ particular. | 8, 16 |
| Conflict | Integer | Synonymous with Clevel (conflict level); the number appearing in this column holds a significant message about the severity of the conflict. Conflicts occurring here indicate problems with particular drivers or data sources. These conflicts must also appear in the GenConflict table. (Only conflicting ODBC attributes are logged in the ODBCConflict table.) ODBC DataSource - A match on the Manager (data source name) is conducted to determine discrepancies, and then compared to the same attributes in the ODBCAtt table. A Warning condition exists if the attribute exists in one driver, but not the other. An Error condition exists if a difference in attribute values occurs, or a different driver is present in ODBCServ. | 0, 1, 2, 4 |

TABLE 22-continued

| Field | Data Type | Details | Example |
|---|---|---|---|
| | | ODBC Driver - A match on the driver and flags (in particular, the Win32 flag) is conducted to determine discrepancies, and then compared to the same attributes in the ODBCAtt table. A Warning condition exists if the attribute exists in one driver, but no the other. An Error condition exists if there is a difference in attribute values. When this field has a value >0, the programmer knows that a conflict has occurred with another path. Both paths should have conflict indications in this field. | |

The ODBCAtt table 136 is the child of the ODBCServ table 134, and therefore has three parent identifiers: the AppKey, PackKey, and ODBCKey. The function of the ODBCAtt table 136 is to list all attributes and attribute values of the drivers listed in the ODBCServ table 134 and to log any conflicts between the drivers. For an entry to exist in ODBCAtt, it must have an associated driver or data source in the ODBCServ table 134. The ODBCKey tells one each attribute's associated driver or data source. Each attribute has a unique identifier, the AttKey, which distinguishes it from all other attributes of a driver.

ODBC attribute conflict information is logged on this table 136 before being transferred to the ODBCConflict table 138. Any attribute with a Conflict value of >0 must be logged on both tables 136 and 138.

Table 23 contains detailed information about the ODBCAtt table fields.

TABLE 23

| Field | Data Type | Details | Example |
|---|---|---|---|
| AppKey (pk) | Integer | Each application to be compared has a unique number. This number is the Application Key (AppKey) and is used to identify this application to all other tables that require an AppKey input. This table uses the AppKey information as one of the parent identifiers. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| ODBCKey (pk) | Long Integer | In the case of this table, this key is also a parent identifier. This field tells you the key number of the driver in the ODBCServ table that is associated with this attribute. | 1, 2, 9, 10, etc. |
| AttKey (pk) | Long Integer | Because there can be many attributes to a driver, the AttKey is the unique number that identifies this attribute from its siblings. | 1, 2, 9, 10, etc. |
| Attribute | 64 Characters | This is the text name of the attribute being described in this row. | FileUsage, DriverODBCVer, Setup, etc. |
| AttValue | 255 Characters | This is the value associated with the named attribute, similar to the name and value pairs of INI files. | YYN, 02.50, *.xls, 0, 1, odbcjt32.dll, etc. |
| Conflict | Integer | Synonymous with Clevel (conflict level); the number appearing in this column holds a significant message about the severity of the conflict. When this field has a value >0, the programmer knows that a conflict has occurred with another path. Both paths should have conflict indications in this field. A Warning needs to be indicated if an attribute exists in one driver and not the other. An Error indication needs to be logged if ODBC attribute values are conflicting. | 0, 1, 2, 4 |

The ODBCConflict table 138 is a child of the ODBCAtt table 136. What makes this conflict table unique is its four parent identifiers: the AppKey, PackKey, ODBCKey and AttKey. The function of the ODBCConflict table 138 is to list all conflicting driver attributes. An attribute must exist in the ODBCAtt table 136 and have a number greater than zero in the Conflict field before it can be entered into the ODBCConflict table 138. The ODBCConflict table 138 contains its AppKey, PackKey, ODBCKey and AttKey information from three ODBCAtt table entries (AppKey1, AppKey2, etc.) Only attribute conflicts are logged here. Because a conflict is a result of a comparison, the conflicts from both attributes need to appear in the ODBCConflict table 138.

Distinguishing one application from another is necessary, and is accomplished by entering all data pertinent to the first compared data source in only the fields with a 1 parent designator. All of the table's fields, with the exception of CLevel, contain such designators to identify the conflicting files. The key number of the first compared driver is entered in the AppKey1 field, then the key number of device 1's affected package is entered in the PackKey1 field. The ODBCKey1 represents the first device's affected ODBC file. Finally, the key number of the affected attribute is entered in the AttKey1 field. The database now knows exactly which is the first attribute that has a conflict. To identify the second conflicting device, fill in the AppKey2, PackKey2, ODBCKey2, and AttKey2 fields.

Table 24 contains detailed information about the ODBCConflict table fields.

TABLE 24

| Field | Data Type | Details | Example |
|---|---|---|---|
| AppKey1 (pk) | Integer | This field identifies the first of the compared applications. The application key number is entered here. | 1 Office 97 |
| PackKey1 (pk) | Integer | The PackKey indicates the version of the application. Different versions of the same application may be compared for conflicts. | 1 Microsoft Word 3.0<br>2 Microsoft Word 4.0 |
| ODBCKey1 (pk) | Long Integer | This field identifies the affected attributes ODBC. The application designator, in this case 1, indicates that this ODBC belongs to the first application. | 2 This number corresponds to the number assigned to a particular attribute. |
| AttKey1 (pk) | Long Integer | This field identifies the specific, conflicting attribute within a package. This application designator, in this case 1, indicates that this attribute belongs to the first of the compared applications. The actual attribute key number is entered here. | 4 Attribute file identified as number 4. |
| AppKey2 (pk) | Integer | This field identifies the second of the compared applications. The application key number is entered here. A value of 0 may be present if the conflict does not appear in the compared application. | 3 WordPerfect |
| PackKey2 (pk) | Integer | The PackKey indicates the version of the application. Different versions of the same application may be compared for conflicts. | 1 Microsoft Word 3.0<br>2 Microsoft Word 4.0 |
| ODBCKey2 (pk) | Long Integer | This field identifies the affected attribute's ODBC. The application designator, in this case 2, indicates that this ODBC belongs to the second application. | 5 An ODBC driver listed within the package, assigned to number 5 |
| AttKey2 (pk) | Long Integer | This field identifies a specific, conflicting attribute within a package. The application designator, in this case 2, indicates that this attribute belongs to the second of the compared applications. The actual attribute key number is entered here. | 1 This number corresponds to the number assigned to a particular attribute |
| CLevel | Integer | Synonymous with Conflict; the number appearing in this column holds a significant message about the severity of the conflict. Only conflicting ODBC attributes are logged in this table. Other ODBC conflicts are logged in the GenConflict table. When this field has a value >0, the programmer knows that a conflict has occurred with another path. Both paths should have conflict indications in this field. | 0, 1, 2, 4 |

The MSIComponent table 140 is a child of the Package table. Its function is to log all Microsoft Windows Installer Components in the compared applications.

A Microsoft Windows Installer Component is the smallest level of an Microsoft Windows Installer install. All changes that can be made to a system are tied to a component. For a record to exist in this table, it must first belong to a package (located in the Package table). It is from this package that the AppKey and PackKey data is obtained, along with data for the other fields.

The specific information housed by the Microsoft Windows Installer Component table and details about each column are listed in Table 25 below.

tables, the GenConflict table 142 has three parent identifiers: the AppKey, PackKey, and ItemKey.

Distinguishing one application from another is necessary, and is accomplished by entering all data pertinent to the first compared shared resource in only the fields with a 1 parent designator. All of the table's fields, with the exception of CLevel, contain such designators to identify the conflicting files. The key number of the first compared application is entered in the AppKey1 field, then the key number of file 1's affected package is entered in the PackKey1 field. The database now knows exactly which is the first shared resource that has a conflict. To identify the second conflicting file, fill in the AppKey2, ItemKey2, and RegKey2 fields. The GenConflict table 142 contains a field called "type".

TABLE 25

| Field | Data Type | Details | Example |
|---|---|---|---|
| AppKey (pk) | Integer | In the case of this table, as well as all other children of the Package table, this field is one of the parent designators. The AppKey is used to indicate that the data in this row pertains to a certain application; the application associated with that particular number. | 1 Office 97<br>3 WordPerfect |
| PackKey (pk) | Integer | The PackKey indicates the version of the application. Different versions of the same application may be compared for conflicts. | 1 Microsoft Word 3.0<br>2 Microsoft Word 4.0 |
| CompKey (pk) | Long Integer | This number establishes the MSIComponent table as a unique child of the Package table. | 1<br>2 |
| Component | 128 Characters | This is the key for the Windows Installer Component within the Microsoft Windows Installer technology. | ProgramFiles, InstallDir |
| Component ID | 38 Characters | This is the GUID for the component | {5CB2D5F0-19DD-11d1-9A9D-006097C4E489} |
| Directory | 32 Characters | This is a key into the Microsoft Windows Installer Directory table that specifies the directory for the Component. | ProgramFiles, PrivateDir |
| Attributes | Integer | This column specifies options for remote execution which is used in the Microsoft Windows Installer . . . | 0, 1, 5 |
| Condition | 255 Characters | This column contains a conditional statement that can control whether or not a component is installed. | InstallMode = "Custom" |
| KeyPath | 72 Characters | This value points to a file or folder belonging to the component that the installer uses to detect the component. | Myprog.exe, mylib .dll |

A GenConflict table 142 houses all non-File and non-Registry conflicts. The Type block allows one to specify what type of file is having the conflict, for example, INI files, Autoexec.bat, etc. Because a conflict is a result of a comparison, the conflicting files from both applications need to appear in the GenConflict table 142. Like other conflict Each code within this field refers to a certain type of file that is experiencing the conflict. This table 142 also contains a CLevel field. When this field has a value >0, the programmer knows that a conflict has occurred with another path.

Table 26 contains detailed information about the GenConflict table fields.

TABLE 26

| Field | Data Type | Details | Example |
|---|---|---|---|
| AppKey1 (pk) | Integer | This field identifies the first of the compared applications. The application key number is entered here. | 1 Office 97 |

TABLE 26-continued

| Field | Data Type | Details | Example |
|---|---|---|---|
| PackKey1 (pk) | Integer | The PackKey indicates the version of the application. Different versions of the same application may be compared for conflicts. | 1 Microsoft Word 3.0<br>2 Microsoft Word 4.0 |
| ItemKey1 (pk) | Long Integer | This field identifies the specific conflicting item within a package. The application designator, in this case 1, indicates that this item belongs to the first of the compared applications. The actual item key number is entered here. | 2 meaning the second file within the package |
| AppKey2 (pk) | Integer | This field identifies the second of the compared applications. The application key number is entered here. | 3 WordPerfect |
| PackKey2 (pk) | Integer | The PackKey indicates the version of the application. Different versions of the same application may be compared for conflicts. | 1 Microsoft Word 3.0<br>2 Microsoft Word 4.0 |
| ItemKey2 (pk) | Long Integer | This field identifies the specific The conflicting item within a package. application designator, in this case 2, indicates that this item belongs to the second of the compared applications. The actual item key number is entered here. | 1 This number corresponds to the number assigned to a particular item |
| Type | Long Integer | The code listed in this field refers to a specific type of file that is experiencing the conflict. | 1, 2, 4 |
| CLevel | Integer | Synonymous with Conflict; the number appearing in this column holds a significant message about the severity of the conflict. When this field has a value >0, the programmer knows that a conflict has occurred with another path. Both paths should have conflict indications in this field. | 2, 4 |

While embodiments of the invention have been illustrated and described, it is not intended that these embodiments illustrate and describe all possible forms of the invention. Rather, the words used in the specification are words of description rather than limitation, and that various changes may be made without departing from the spirit and scope of the invention.

What is claimed is:

1. A method of managing software conflicts in a computer system, comprising the steps of:
receiving change information regarding actual changes made to files and other shared resources during installation of different applications into the computer system;
processing the change information to determine conflict information pertaining to which files and shared resources conflict with one another;
storing the conflict information in a database; and
resolving any software conflicts based on the stored conflict information.

2. The method of claim 1, wherein the conflict information includes DLL file conflict information.

3. The method of claim 1, wherein the conflict information includes registry conflict information.

4. The method of claim 1, wherein the conflict information includes shortcut conflict information.

5. The method of claim 1, wherein the conflict information includes driver conflict information.

6. The method of claim 1, wherein the conflict information includes data source conflict information.

7. The method of claim 1, wherein the conflict information includes service conflict information.

8. The method of claim 1, wherein the conflict information includes device conflict information.

9. The method of claim 1, wherein the conflict information includes Microsoft Windows Installer component conflict information.

10. The method of claim 1, wherein the conflict information includes autoexec.bat conflict information.

11. The method of claim 1, wherein the conflict information includes config.sys conflict information.

12. The method of claim 1, wherein the conflict information includes INI changes conflict information.

13. The method of claim 1, wherein the conflict information includes path conflict information.

14. The method of claim 1, wherein the step of resolving any software conflicts includes the step of generating an installer based on the stored conflict information.

15. The method of claim 1, wherein at least one of the tables has a conflict field for storing a conflict level indication therein.

16. The method of claim 1, wherein two INI files conflict if they have the same path, section and entry.

17. The method of claim 1, wherein two configuration files conflict if they have the same command data and entry data.

18. The method of claim 1, wherein two shortcuts conflict if they have matching desktop-displayable human-readable text associated therewith, a matching location, and a matching icon group, but have either an unmatched path that leads to a program executed by the shortcut, unmatched parameters passed to the program being launched from the shortcut, an unmatched directory within which the launched program is to startup, an unmatched icon number for a particular program, or an unmatched path and filename of a file containing a desktop-displayable icon associated with the shortcut.

19. The method of claim 1, wherein resources are determined to conflict based on installer component GUIDs.

20. The method of claim 19, wherein identical resources are determined to conflict if they have different component GUIDs.

21. The method of claim 1, further including the step of determining the change information.

22. The method of claim 1, wherein the database is in the form of interrelated tables.

23. A computer-readable storage medium having stored therein a program which executes the steps of:
receiving change information regarding actual changes made to files and other shared resources during installation of different applications into the computer system;
processing the change information to determine conflict information pertaining to which files and shared resources conflict with one another;
storing the conflict information in a database; and
resolving any software conflicts based on the stored conflict information.

24. The storage medium of claim 23, wherein the program further executes the step of generating an installer for the application.

25. The storage medium of claim 23, wherein the program is further operative to execute the step of determining the change information.

26. The storage medium of claim 23, wherein the database is in the form of interrelated tables.

27. A system for managing software conflicts, comprising:
means for receiving change information regarding actual changes made to a computer system's files and other shared resources during installation of different applications into the computer system;
means for processing the change information to determine conflict information pertaining to which files and shared resources conflict with one another;
a database for storing the conflict information; and
means for resolving the software conflicts based on the stored conflict information.

28. The system of claim 27, wherein the conflict information includes DLL file conflict information.

29. The system of claim 27, wherein the conflict information includes registry conflict information.

30. The system of claim 27, wherein the conflict information includes shortcut conflict information.

31. The system of claim 27, wherein the conflict information includes driver conflict information.

32. The system of claim 27, wherein the conflict information includes data source conflict information.

33. The system of claim 27, wherein the conflict information includes service conflict information.

34. The system of claim 27, wherein the conflict information includes device conflict information.

35. The system of claim 27, wherein the conflict information includes Microsoft Windows Installer component conflict information.

36. The system of claim 27, wherein the conflict information includes autoexec.bat conflict information.

37. The system of claim 27, wherein the conflict information includes config.sys conflict information.

38. The system of claim 27, wherein the conflict information includes INI changes conflict information.

39. The system of claim 27, wherein the conflict information includes path conflict information.

40. The system of claim 27, wherein the means for resolving includes means for generating an installer from the information stored in the database for the at least one application.

41. The system of claim 27, wherein at least one of the tables has a conflict field for storing a conflict level indicator therein.

42. The system of claim 27, further including means for determining the change information.

43. The system of claim 27, wherein the database is in the form of interrelated tables.

44. A method of managing software conflicts in a computer system, comprising the steps of:
receiving change information regarding actual changes made to files and other shared resources during installation of at least one application into the computer system;
processing the change information to determine conflict information pertaining to which files and shared resources conflict with one another, the conflict information including one of a plurality of different conflict severity values;
storing the conflict information in a database; and
resolving any software conflicts based on the stored conflict information.

45. The method of claim 44, wherein the plurality of different conflict severity values comprises an informational value and an error value.

46. The method of claim 45, wherein the error value indicates a more severe conflict than the informational value.

47. The method of claim 45, wherein the plurality of different conflict severity values further comprises a warning value.

48. The method of claim 47, wherein the error value indicates a more severe conflict than the warning value, and wherein the warning value indicates a more severe conflict than the informational value.

49. The method of claim 47, wherein the database of tables includes a file conflict table having records only for files whose conflict value is either the warning value or the error value.

50. The method of claim 44 wherein, if two files have the same destination filename and destination directories, the conflict severity value is derived by:
determining if at least one of a version, an internal version, a date, a time and a size for the two files do not match.

51. The method of claim 44 wherein, if two files are 16-bit executables and have the same destination filename, the conflict severity value is derived by:
determining if at least one of a version, an internal version, a date, a time and a size for the two files do not match.

52. The method of claim 44 wherein, if two files have the same destination filename and destination directories, the conflict severity value is derived by:
  determining if the two files have a version, an internal version, a date, a time and a size that match.

53. The method of claim 44, wherein, if two files are 16-bit executables and have the same destination filename, the conflict severity value is derived by:
  determining if the two files have a version, an internal version, a date, a time and a size that match.

54. The method of claim 44 wherein, if two files are 16-bit executables and have the same destination filename, the conflict severity value is derived by:
  determining if the destination directories for the two files do not match.

55. The method of claim 44 wherein, if two registry files have the same registry path and registry key names, the conflict severity value is derived by:
  determining if at least one of a subset of characters of a text name of the registry key, a data type, and an operation for the two registry files do not match.

56. The method of claim 44 wherein, if two ODBC drivers have the same driver name and the same number of bits, the conflict severity value is derived by:
  determining if an attribute exists for one of the two ODBC drivers and is non-existent for another of the two ODBC drivers.

57. The method of claim 44 wherein, if two ODBC drivers have the same driver name and same number of bits, the conflict severity value is derived by:
  determining if an attribute for one of the two ODBC drivers has a different value than the attribute for another of the two ODBC drivers.

58. The method of claim 44, including at least three conflict severity values.

59. The method of claim 44, wherein the conflict severity value is derived by determining a respective conflict value for each conflict.

60. The method of claim 44, wherein the step of storing the conflict information comprises storing the conflict value in the database.

61. The method of claim 44, wherein the conflict severity values include a warning value and an error value.

62. The method of claim 61, wherein the error value indicates a more severe conflict than the warning value.

63. The method of claim 44, wherein the plurality of different conflict severity values comprises an informational value, a warning value and an error value, wherein the error value indicates a more severe conflict than the warning value, and the warning value indicates a more severe conflict than the informational value, and for each of two files having the same destination filename:

the conflict value is set to the warning value if destination directories for the two files match or the two files are 16-bit executables, and at least one of a version, an internal version, a date, a time and a size for the two files do not match;

the conflict value is set to the error value if the destination directories for the two files match or the two files are 16-bit executables, and the two files have a version, an internal version, a date, a time and a size which match; and the conflict value is set to the informational value if the destination directories for the two files do not match and the two files are not 16-bit executables.

64. The method of claim 44, further including the step of determining the change information.

65. The method of claim 44, wherein the database is in the form of interrelated tables.

* * * * *

UNITED STATES PATENT AND TRADEMARK OFFICE
CERTIFICATE OF CORRECTION

| | | |
|---|---|---|
| PATENT NO. | : 7,028,019 B2 | |
| APPLICATION NO. | : 09/189559 | |
| DATED | : April 11, 2006 | |
| INVENTOR(S) | : John J. Mcmillian et al. | |

It is certified that error appears in the above-identified patent and that said Letters Patent is hereby corrected as shown below:

Title Page; item (54);

Cover, Title should read: -- Method And System For Identifying And Resolving Software Conflicts and Computer-Readable Storage Medium Having A Program For Executing The Method --

Title Page; item (56); Page 2;

Cover, Reference, add -- 5,842,024, 12/1996, Choye et al., 717/11 --

Cover, Reference, add -- 5,586,304, 12/1996, Stupek, Jr. et al., 117/170 --

Cover, Reference, add -- 5,634,114, 05/1997, Shipley, 717/170 --

Cover, Reference, add -- 6,192,375, 2/2001, Gross, 707/200 --

Cover, Reference, add -- 6,154,878, 11/2000, Saboff, 717/173 --

Cover, Reference, add -- 5,956,513, 09/1999, McLain, Jr., 717/142 --

Cover, Reference, add -- 5,903,897, 05/1999, Carrier, III et al., 707/203 --

Cover, Reference, add -- 5,119,377, 06/1992, Cobb et al., 717/38 --

Cover, Reference, add -- 5,347,518, 09/1994, Lee, 714/38 --

Cover, Reference, add -- 6,119,246, 09/2000, McLaughlin et al., 714/27 --

Cover, Reference, add -- 5,655,154, 08/1997, Jain et al., 719/310 --

Cover, Reference, add -- 5,991,774, 11/1999, Tate et al., 707/203 --

Cover, Reference, add -- 6,145,056, 11/2000, Heydon et al., 711/129 --

Cover, Reference, add -- EP 1148417, 10/2001, Europe Snow, 11/22 --

UNITED STATES PATENT AND TRADEMARK OFFICE
CERTIFICATE OF CORRECTION

| | |
|---|---|
| PATENT NO. | : 7,028,019 B2 |
| APPLICATION NO. | : 09/189559 |
| DATED | : April 11, 2006 |
| INVENTOR(S) | : John J. Mcmillian et al. |

It is certified that error appears in the above-identified patent and that said Letters Patent is hereby corrected as shown below:

Column 3, line 1, replace "patens" with -- patents --

Signed and Sealed this

Eighteenth Day of September, 2007

JON W. DUDAS
*Director of the United States Patent and Trademark Office*